(12) United States Patent
Ho et al.

(10) Patent No.: US 11,194,101 B2
(45) Date of Patent: Dec. 7, 2021

(54) LC ONE PIECE FRONT LOADED FERRULE WITH UNITARY RETAINER AND FERRULE HOLDER

(71) Applicant: Senko Advanced Components, Inc., Marlborough, MA (US)

(72) Inventors: Man Ming Ho, Kowloon (HK); Kazuyoshi Takano, Tokyo (JP)

(73) Assignee: Senko Advanced Components, Inc., Marlborough (MA)

( * ) Notice: Subject to any disclaimer, the term of this patent is extended or adjusted under 35 U.S.C. 154(b) by 0 days.

(21) Appl. No.: 16/567,438

(22) Filed: Sep. 11, 2019

(65) Prior Publication Data

US 2020/0081195 A1 Mar. 12, 2020

Related U.S. Application Data

(60) Provisional application No. 62/744,603, filed on Oct. 11, 2018, provisional application No. 62/743,945, filed on Oct. 10, 2018, provisional application No. 62/729,610, filed on Sep. 11, 2018.

(51) Int. Cl.
*G02B 6/38* (2006.01)

(52) U.S. Cl.
CPC ........... *G02B 6/3833* (2013.01); *G02B 6/381* (2013.01); *G02B 6/3869* (2013.01)

(58) Field of Classification Search
CPC ... G02B 6/3833; G02B 6/3831; G02B 6/3869
USPC .......................................................... 385/53
See application file for complete search history.

(56) References Cited

U.S. PATENT DOCUMENTS

| 5,134,677 | A | * | 7/1992 | Leung | G02B 6/3825 385/62 |
| 5,481,634 | A | * | 1/1996 | Anderson | G02B 6/3893 385/76 |
| 6,017,154 | A | * | 1/2000 | Carlisle | G02B 6/3869 385/86 |
| 6,196,733 | B1 | * | 3/2001 | Wild | G02B 6/3887 385/139 |
| 6,259,856 | B1 | * | 7/2001 | Shahid | G02B 6/3879 385/147 |
| 6,325,549 | B1 | * | 12/2001 | Shevchuk | G02B 6/3809 385/76 |
| 6,419,399 | B1 | * | 7/2002 | Loder | G02B 6/3869 385/53 |
| 6,789,959 | B1 | * | 9/2004 | Conn | G02B 6/3897 385/100 |
| 6,955,479 | B2 | | 10/2005 | Erdman et al. | |
| 6,962,446 | B2 | * | 11/2005 | Greub | G02B 6/25 385/134 |

(Continued)

OTHER PUBLICATIONS

International Search Report and Written Opinion issued for PCT/US2019/050611, dated Jan. 7, 2020, 13 pages.

*Primary Examiner* — Kaveh C Kianni

(57) ABSTRACT

Embodiments disclosed herein are a fiber optic connector construed using a front loadable unitary retainer and ferrule assembly inserted within a unitary connector housing at a proximal end of the connector housing. The unitary retainer and ferrule assembly has a pair of opposing protrusions at a proximal end configured to be accepted within the unitary connector housing and secured further therein with a bias member.

17 Claims, 9 Drawing Sheets

(56) References Cited

U.S. PATENT DOCUMENTS

| | | | |
|---|---|---|---|
| 7,150,567 B1* | 12/2006 | Luther | G02B 6/3851 385/78 |
| 7,758,389 B2* | 7/2010 | Kadar-Kallen | G02B 6/389 439/660 |
| 7,766,556 B2* | 8/2010 | Kachmar | G02B 6/3869 385/55 |
| 7,997,806 B2 | 8/2011 | Nakagawa | |
| 8,678,670 B2 | 3/2014 | Takahashi et al. | |
| 9,664,862 B2* | 5/2017 | Lu | G02B 6/3869 |
| 9,678,283 B1* | 6/2017 | Chang | G02B 6/3879 |
| 10,634,854 B2* | 4/2020 | Davidson | G02B 6/3831 |
| 10,725,248 B2* | 7/2020 | Wong | G02B 6/3825 |
| 2001/0019654 A1* | 9/2001 | Waldron | G02B 6/3869 385/134 |
| 2002/0150343 A1* | 10/2002 | Chiu | G02B 6/3897 385/53 |
| 2002/0150353 A1* | 10/2002 | Chiu | G02B 6/3897 385/88 |
| 2003/0133665 A1* | 7/2003 | Chiu | G02B 6/3825 385/53 |
| 2004/0161207 A1* | 8/2004 | Chiu | G02B 6/4261 385/88 |
| 2005/0018973 A1* | 1/2005 | Loder | G02B 6/3885 385/53 |
| 2005/0117854 A1* | 6/2005 | Chiu | G02B 6/3897 385/92 |
| 2005/0213890 A1* | 9/2005 | Barnes | G02B 6/3821 385/55 |
| 2005/0213892 A1* | 9/2005 | Barnes | G02B 6/3806 385/62 |
| 2006/0093300 A1* | 5/2006 | Marrs | G02B 6/3846 385/134 |
| 2006/0115219 A1* | 6/2006 | Mudd | G02B 6/3887 385/62 |
| 2006/0269194 A1* | 11/2006 | Luther | G02B 6/3851 385/78 |
| 2007/0104425 A1* | 5/2007 | Larson | G02B 6/3846 385/86 |
| 2009/0191738 A1* | 7/2009 | Kadar-Kallen | G02B 6/389 439/207 |
| 2010/0098381 A1* | 4/2010 | Larson | G02B 6/3846 385/60 |
| 2011/0058772 A1* | 3/2011 | Bylander | G02B 6/3825 385/59 |
| 2015/0355417 A1* | 12/2015 | Takano | G02B 6/3897 385/60 |
| 2016/0139343 A1 | 5/2016 | Dean, Jr. et al. | |
| 2016/0139344 A1 | 5/2016 | de los Santos Campos et al. | |

* cited by examiner

LC ONE PIECE FRONT LOADED FERRULE WITH UNITARY RETAINER AND FERRULE HOLDER

PRIORITY CLAIM TO RELATED-APPLICATIONS

This application claims the benefit of priority of U.S. Provisional Application No. 62/729,610 filed Sep. 11, 2018 titled "LC One Piece Front Loaded Ferrule with Unitary Retainer and Ferrule Holder", which is incorporated herein by reference in its entirety.

BACKGROUND

The present disclosure relates generally to fiber optic connectors having at least one ferrule assembly inserted into a housing. The connectors that can use the invention, among others, is a Lucent Connector (LC) connector, SN® or CS® connectors sold by assignee of the present invention. The disclosure relates to front loading a unitary retainer and ferrule assembly into a connector housing.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels has not been fully realized.

SUMMARY

The invention in a first embodiment provides a connector with a unitary or single body with an opening at the front end or proximal end configured to receive a unitary retainer and ferrule assembly which is secured within an inner connector housing. The connector housing has a release to depress a latch that that secures the connector within an adapter port. The use activates the release to depress the latch on the connector to allow the latch to move out of the adapter recess. In place of the latch and release can be a pull tab as known in the art, and disclosed in U.S. Pat. No. 2,465, 531B2, titled "Latching Connector with Remote Release" assigned to the assignee of the present invention. A distal end or second end of the unitary connector housing has a flange post formed as part of the unitary connector housing to accept and secure a fiber optic cable with an optical fiber therein. The ferrule assembly is in communication with the optical fiber of the fiber optic cable. This connection is made in the factory called factory terminated, or in the field called field terminated by a mechanical splice or a fusion splice. The ferrule assembly is biased forward using a bias spring placed at a distal end of the unitary retainer and ferrule assembly and backpost formed as part of the unitary retainer and ferrule assembly. The spring or similar bias member is positioned about a flange tube that accepts and protects the optical fiber.

In a second embodiment, the unitary retainer and ferrule assembly is defined with a proximal end or first end. A ferrule with an optical fiber protrudes from the first end. The ferrule is secured within the first end of the assembly. The first end further defines a nub with a pair of opposing latches or protrusions. The protrusions are secured within the inner connector housing to retain the unitary retainer and ferrule assembly. At a mid-section is a ferrule flange that accepts a distal end of the ferrule body. And at a distal end or second end of the unitary retainer and ferrule assembly is a ferrule holder or backpost to which fiber optic cable jacket or strength members are secured. This aids in pull strength on the fiber optic cable during use, which is an industry standard. The backpost is further configured with a raised surface over which a proximal end of the flange tube can be placed. The raised edge or surface expands the flange tube. The tube then attempts to return to its original shape and compresses about the raised surface and backpost and the tube relaxes and seals about the raised surface and the backpost.

A third embodiment of the unitary retainer and ferrule assembly is similar to the second embodiment except that opposing latches protrusions extend from a top surface of the nub which extends the overall length of the unitary retainer and ferrule assembly. The latches are secured within the inner housing of the connector to hold the unitary retainer and ferrule assembly after front loading the unitary retainer and ferrule assembly into a proximal end of the connector housing.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or component thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Figure 1:
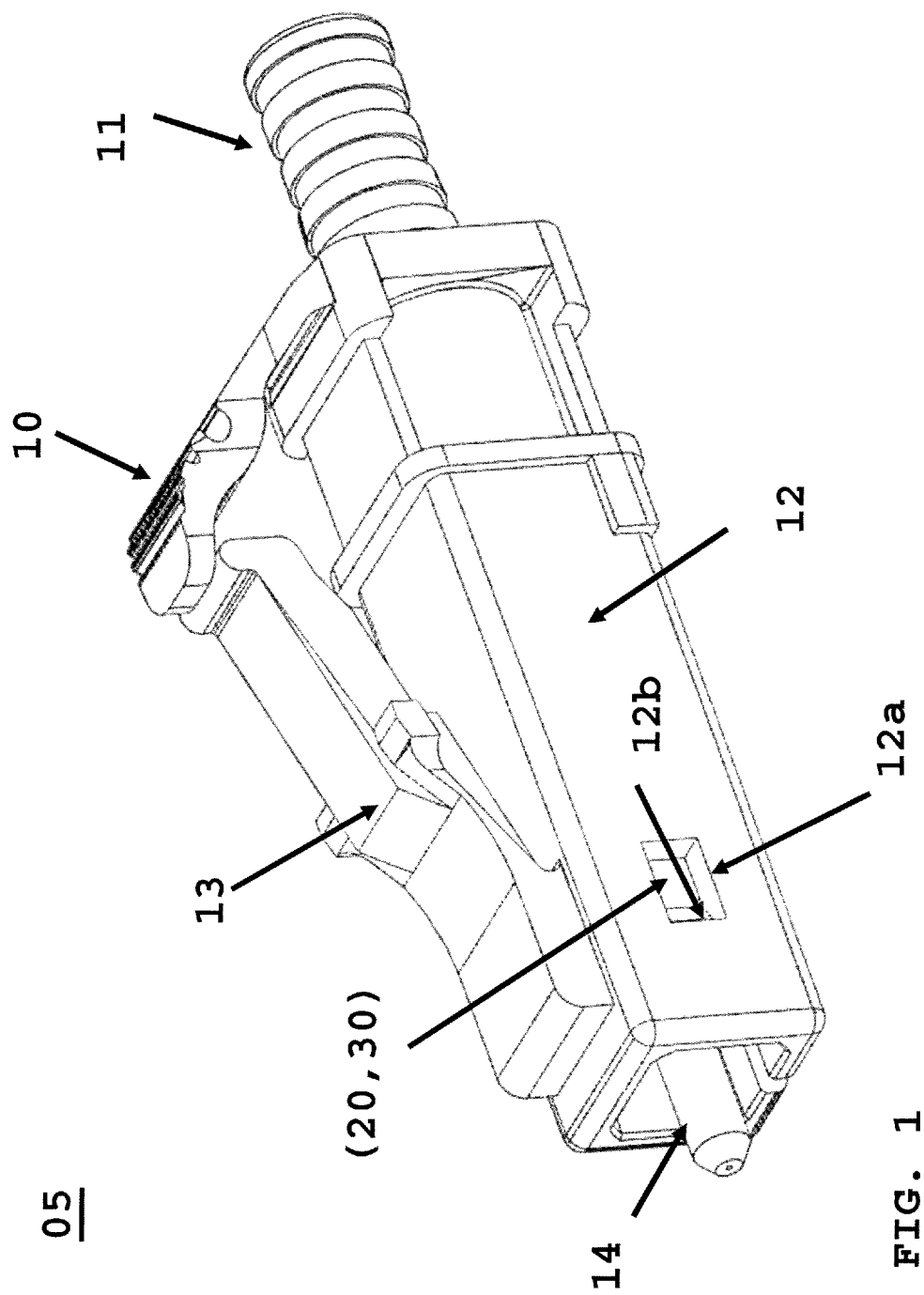
FIG. 1 is a perspective view of a unitary fiber optic connector assembled.

FIG. 1 depicts a perspective view of the present invention unitary body connector 05 with either unitary retainer and ferrule assembly (20, 30) (refer to FIG. 5A and FIG. 5B) secured within connector housing 12. Unitary body connector 05 has a first end or proximal end with ferrule 14 protruding from within connector housing 12. Connector 05 housing 12 has on one side a latch release 10 that when depressed pushes latch 13 downward to allow the release of connector 16 from an adapter port (not shown). Distal end of connector 05 further comprises crimp post 11 to accept a fiber optic cable jacket or strength fibers provided as part of the fiber optic cable. After crimping the fiber optic cable to the distal end of connector 05, an optical fiber within the cable is further secured from movement when the connector is removed from the adapter port as known in the prior art. Ferrule 14 has a short optical fiber called a pig tail that is secured to the data providing optical fiber of the optical fiber cable. This is done by a mechanical splice or fusion splice of the two optical fibers. Connector housing 12 has an opening 12a formed as part of the connector housing. Opening 12a accepts protrusion (20a, 30b) and flat 12b mates with generally perpendicular face (20g, 30g) (refer to FIG. 5A, FIG. 5B) and under spring 15 bias force secures unitary retainer and ferrule assembly (20, 30) within connector housing 12.

Figure 2:
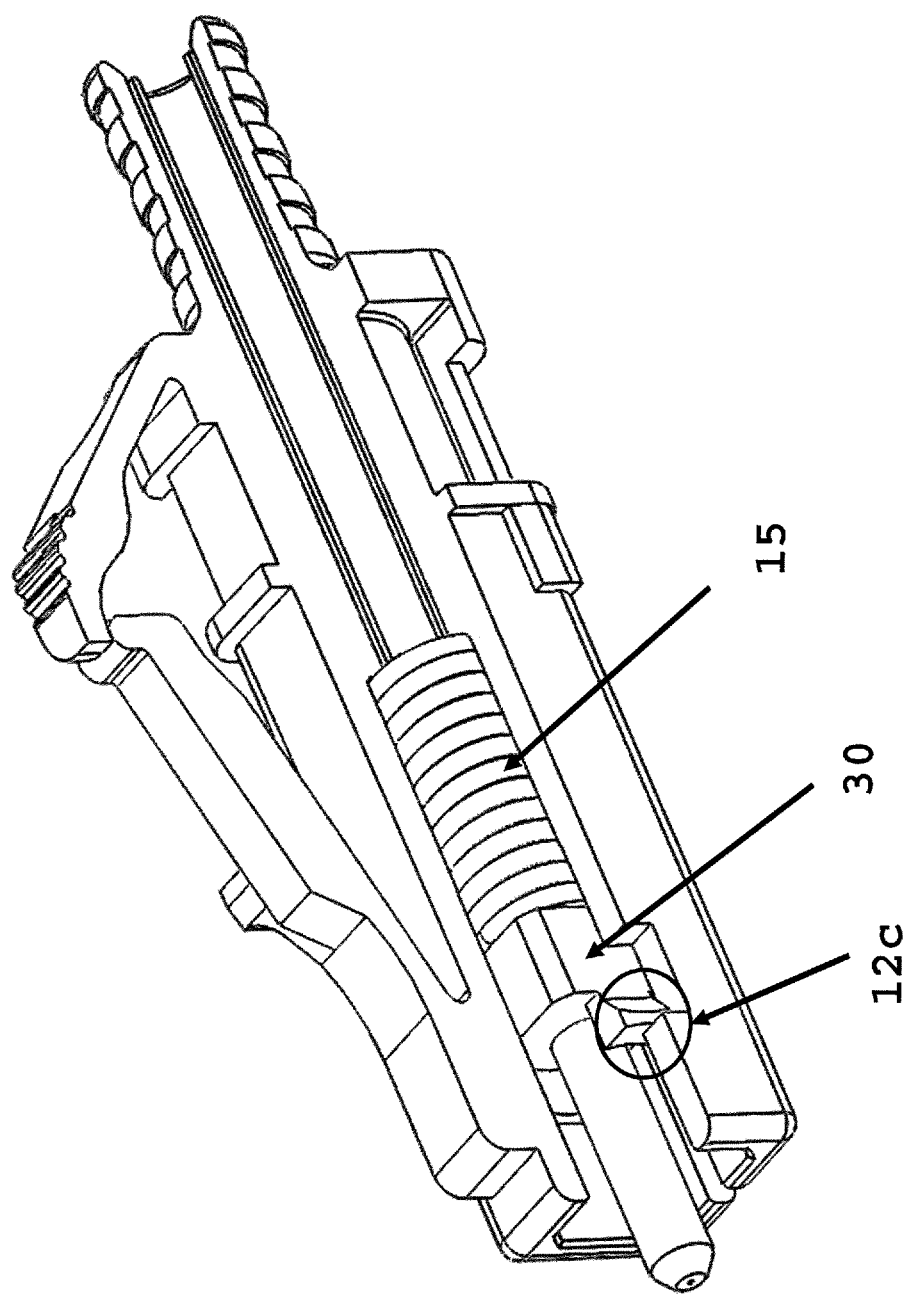
FIG. 2 is an isometric view of the assembled connector of FIG. 1.

FIG. 2 depicts an isometric view of assembled connector 05 of FIG. 1. Bias spring 15 holds a distal end of unitary retainer and ferrule assembly 20, which pushes ferrule 14 forward. Protrusions (20b, 30b) center and align ferrule 14 for interconnection with an opposing fiber optic connector inserted into an opposite adapter port to that of connector 05. Call-out 12c depicts the face of unitary retainer and ferrule assembly 30 firmly against flat 12b of opening 12a of connector housing 12. (Refer to FIG. 7 and FIG. 8) Ferrule 14 may be compressed distally an amount L. (Refer to FIG. 3) This allows for an end-face to end-face connection between two opposing connectors to reduce insertion loss. This loss is when two opposing ferrules are not parallel to each other, and light is dispersed. When light is dispersed data is lost, as data is light. Spring 15 or similar bias member may be made out of thin metal, or formed of a plastic with memory.

Figure 3:
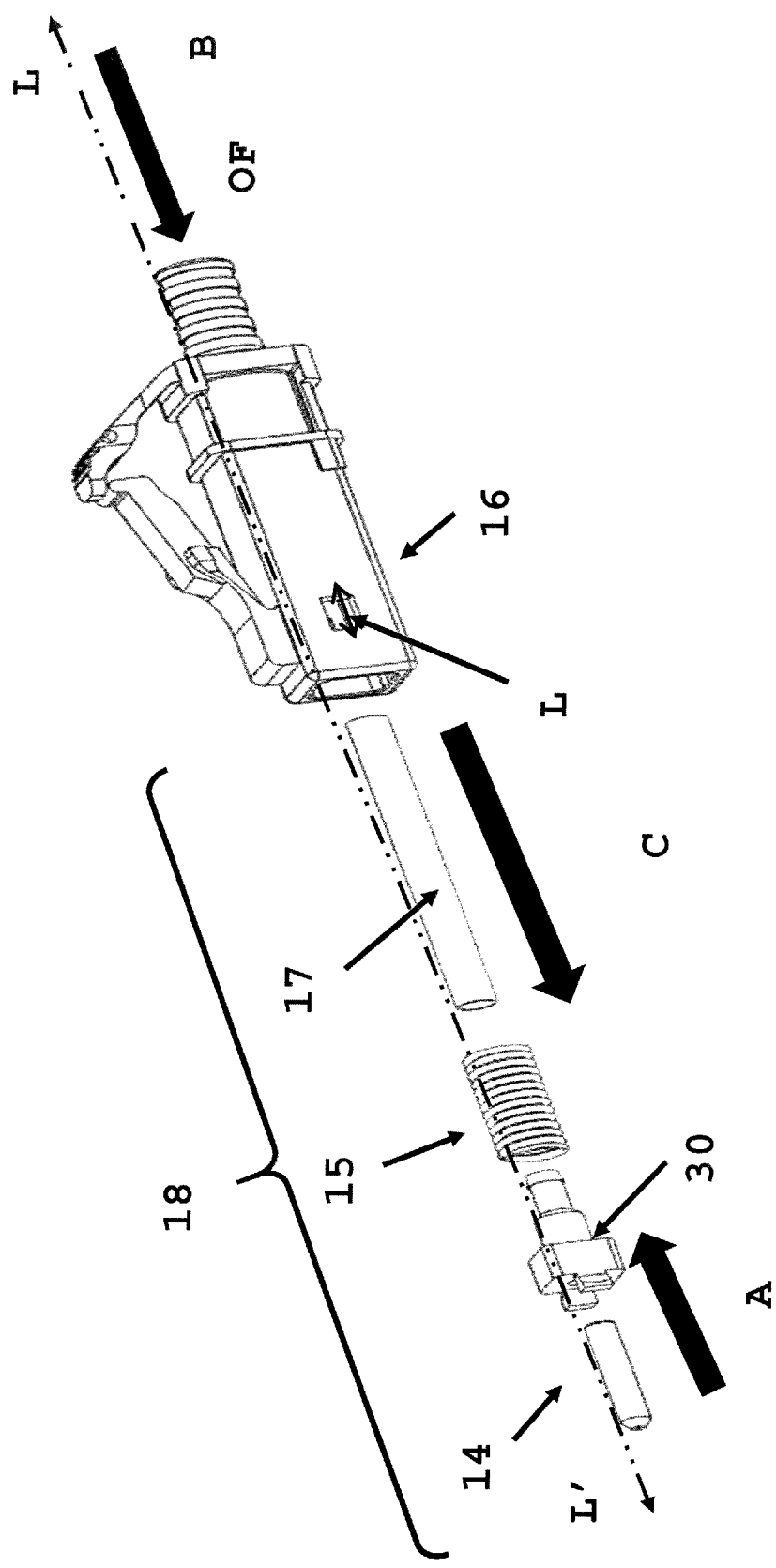
FIG. 3 is an exploded view of the connector of FIG. 1.
Figure 6:
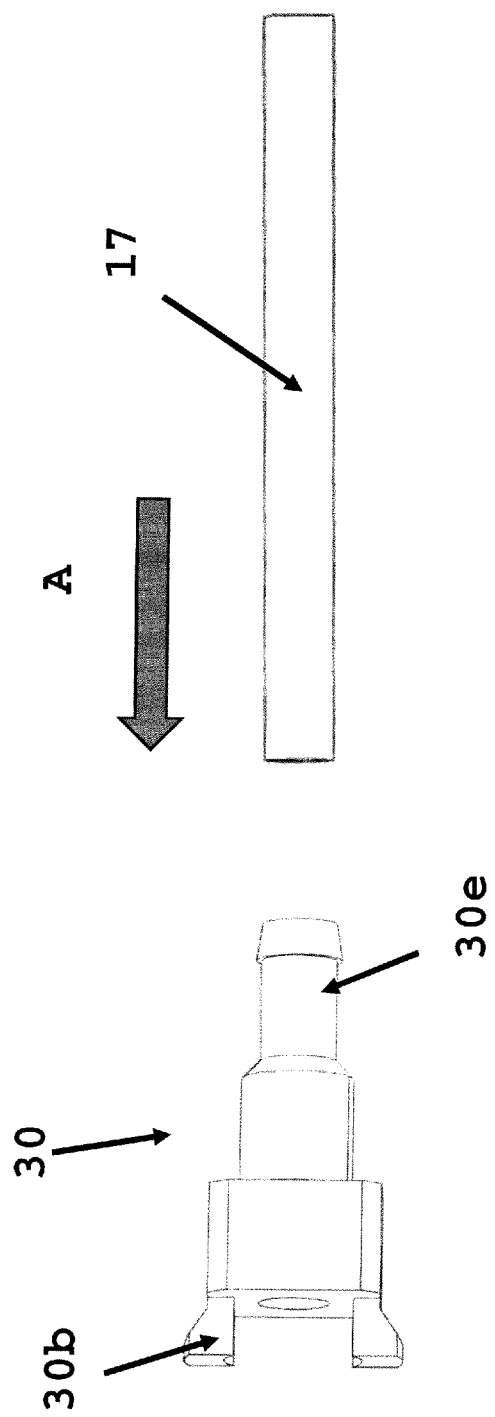
FIG. 6 is an exploded view prior to assembly of a protective tube about the distal end of the unitary retainer and ferrule assembly of FIG. 5B.

FIG. 3 depicts an exploded view of connector 05 prior to assembly as depicted in FIG. 1. Step A ferrule 14 is inserted into a proximal end of unitary retainer and ferrule assembly (20, 30). At step B, a fiber optic cable (not shown) with an optical fiber therein is secured by splicing to an optical fiber pig tail on a distal end of ferrule 14. "OF" or optic fiber is inserted thru crimp post 11, thru connector housing 12, thru flange tube 17, spring 15 and opening 20a of unitary retainer and ferrule assembly (20, 30) along dotted L-L'. At step C, flange tube 17 is inserted over backpost 30e as shown in FIG. 6. Front loadable unitary retainer and ferrule assembly 18 is formed after Steps A-C are completed, and then assembly 18 is inserted into the proximal end of unitary connector 16. Upon complete insertion of assembly 40, protrusions (20b, 30b) are captured within opening 12a as described in FIG. 7 and FIG. 8. Flange tube is called a protective tube and is formed as an elastic material. The tube is used to protect a splice point or connection point between an optical fiber pig tail that is formed as part of ferrule 14, and an optical fiber formed as part of the fiber optic cable. Flange tube 17 or protective tube is secured over raised surface (20f, 30f) and about backpost (20e, 30e) at a distal end of unitary retainer and ferrule assembly (20,30).

Figure 4:
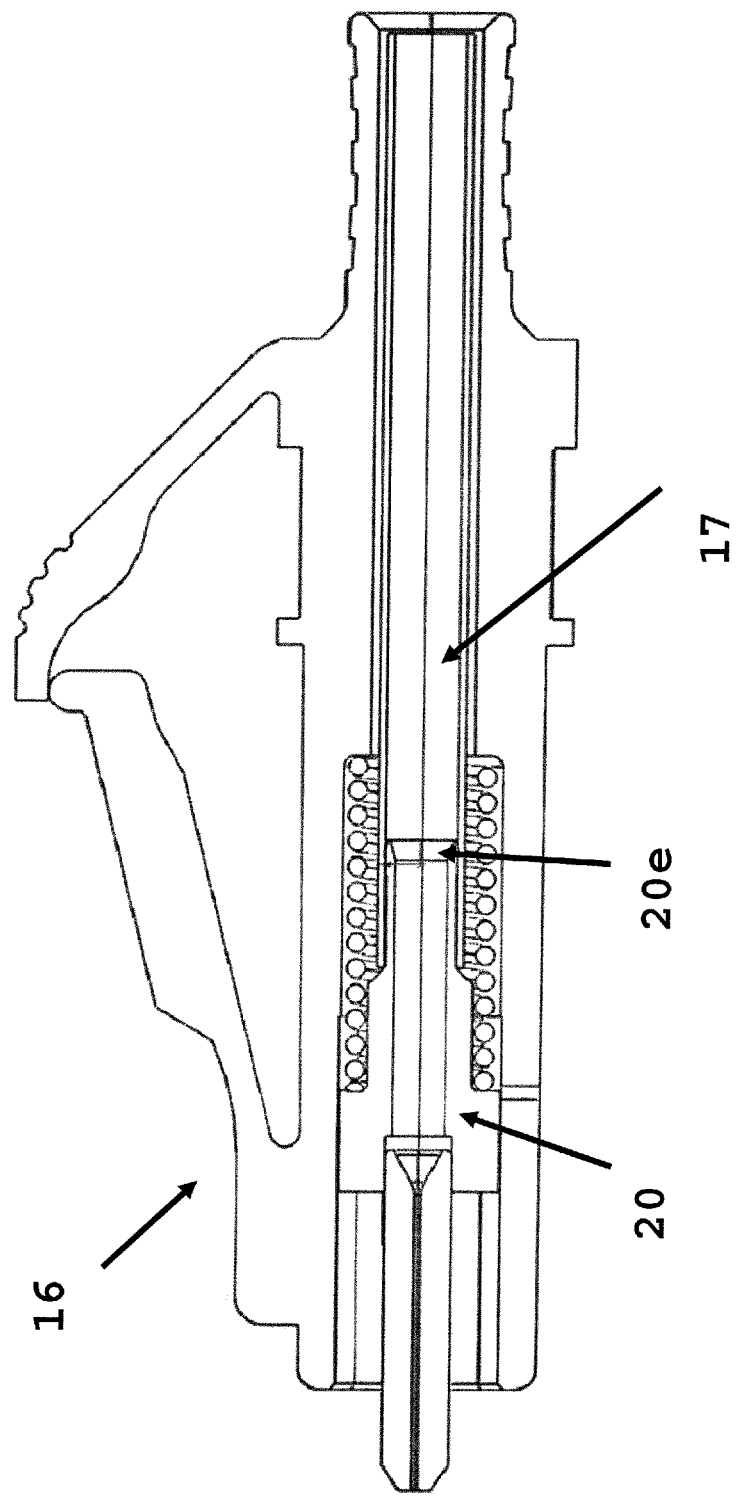
FIG. 4 is a cross-section of the connector of FIG. 1.
Figure 5A:
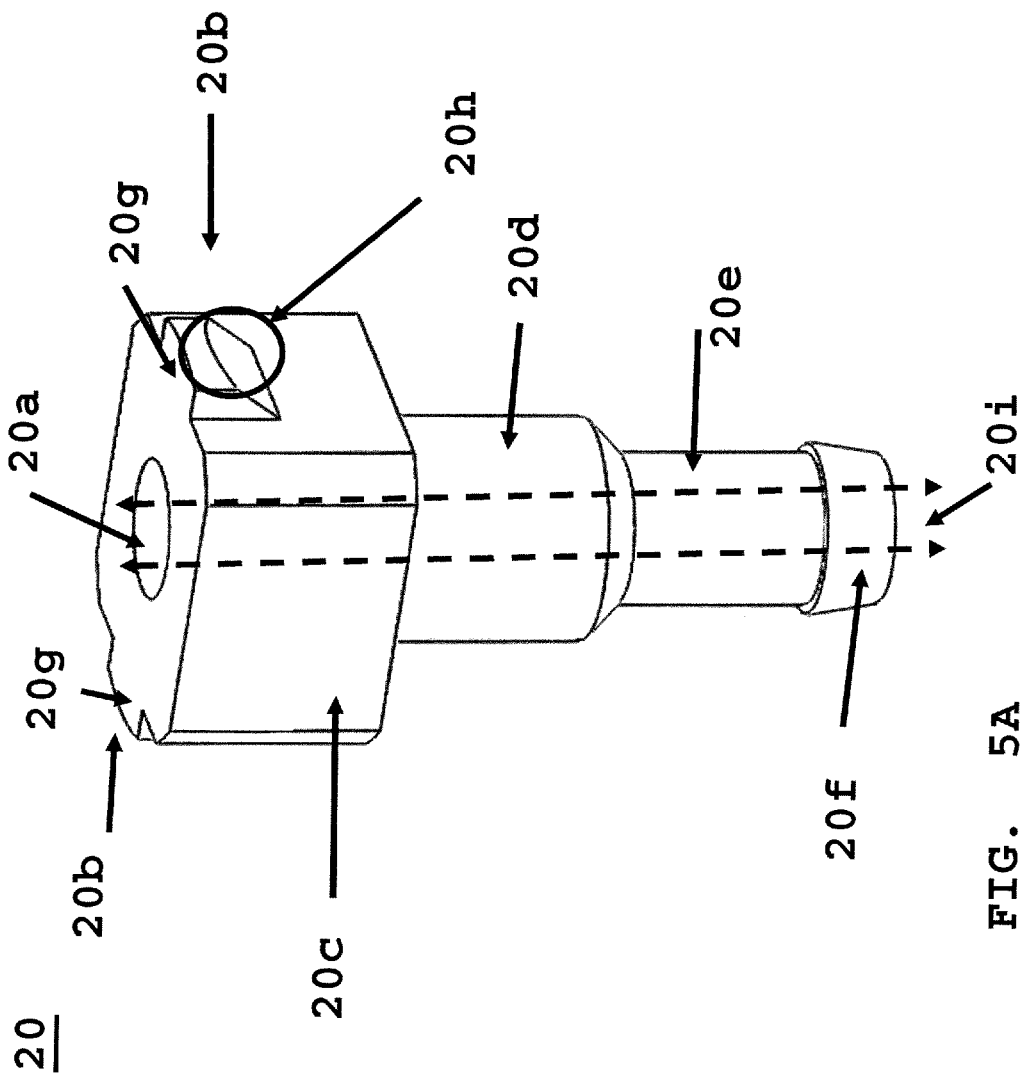
FIG. 5A is a perspective view of a first embodiment of the unitary retainer and ferrule assembly deployed in the connector of FIG. 1.

FIG. 4 depicts a cross-section of FIG. 1 connector 16 assembled using unitary retainer and ferrule assembly 20 of FIG. 5A secured within unitary connector 16. Flange tube 17 is secured over backpost 20e. FIG. 5A depicts a first embodiment of unitary retainer and ferrule assembly 20. At the distal end is raised surface 20 over which flange tube 17 is expanded. Raised surface 20 is formed as part of backpost 20e. Backpost 20e is formed as part of ferrule flange 20d, the latter accepts the distal end or fiber pig tail end of ferrule 14, thereby securing ferrule 15 with unitary retainer and ferrule assembly 20. Nub 20c is sized and shaped to be secured within connector housing 12, depicted in FIG. 7 and FIG. 8. Unitary connector housing 12 is disclosed as rectangular but may be square or oval in shape depending on the application. Protrusions or latches 20b formed as part of nub 20c, along opposing sides of nub 20c. Upon insertion or front loading of front loadable unitary retainer and ferrule assembly 18 into connector housing 16, chamfered edge 20h is formed as part of protrusion 20b slightly expands housing 16, and chamfered edge 20h guides unitary retainer and ferrule assembly 20 into connector housing 16 until protrusion 20b resides within opening 20a. Each protrusion 20b (and protrusion 30b of FIG. 5B) is formed as a part of nub 20c and opposing protrusions (30b, 30b) are nearer a proximal end of nub 20c. Protrusions have face (20g, 30g) that is generally perpendicular to longitudinal axis B-B' (refer to FIG. 5B), and chamfered edge (20h, 30h) is generally offset and parallel to longitudinal axis B-B'. Chamfered edge (20h, 30h) engages corresponding structure within unitary connector housing 12, at a proximal end, and slightly expands the inner unitary connector housing, and offset accepts the inner connector housing along offset to avoid jamming front loadable unitary retainer and ferrule assembly 40 when constructing fiber optic connector 05.

Figure 5B:
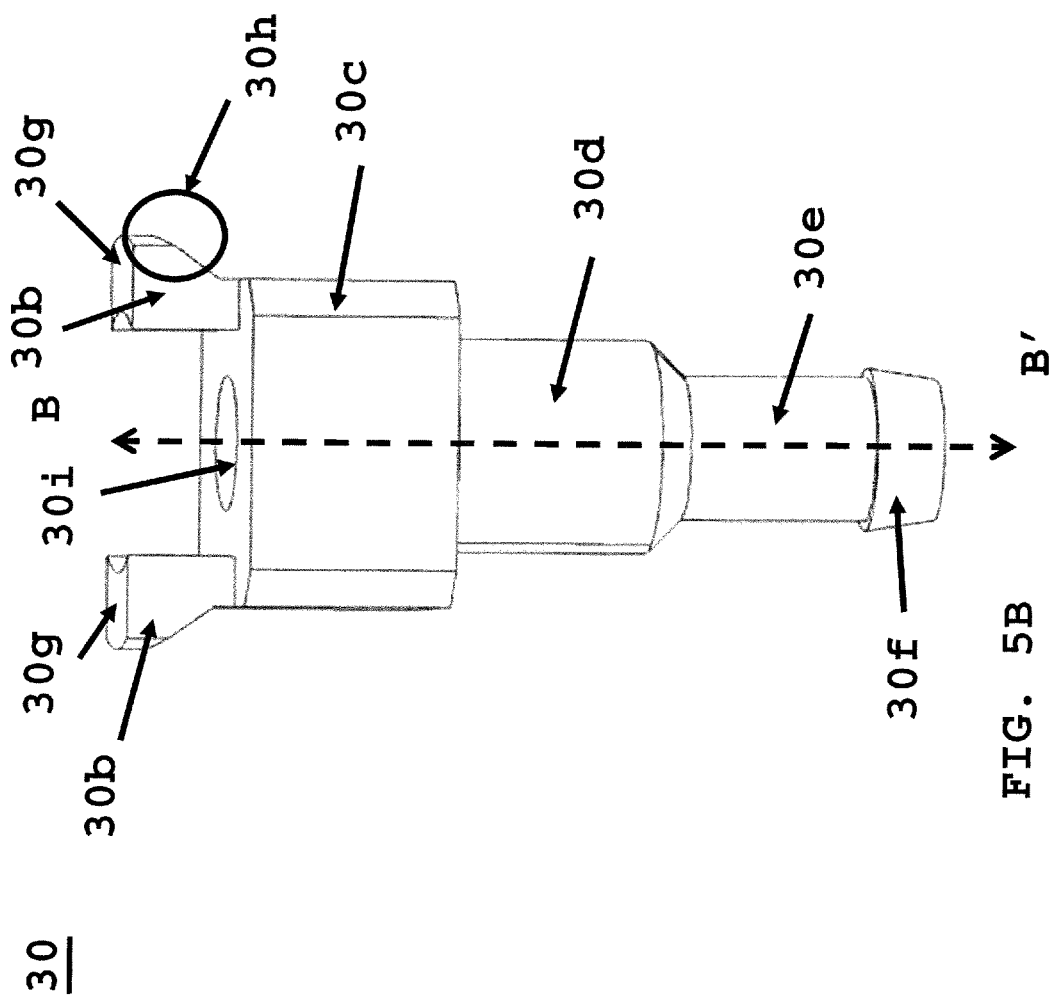
FIG. 5B is a perspective view of a second embodiment of the unitary retainer and ferrule assembly deployed in the connector of FIG. 1.

FIG. 5B depicts a second embodiment of unitary retainer and ferrule assembly 30. With like element numbers depicting the same structure between FIG. 5A and FIG. 5B, for example ferrule flange 30d performs the same function as ferrule flange 20d of unitary retainer ferrule assembly 20. The difference between FIG. 5A and FIG. 5B unitary retainer and ferrule assembly, is protrusions 30b are on a top surface of nub 30c at the most proximal end of nub 30c. This structure extends unitary retainer and ferrule assembly 30 or makes it slightly longer to accommodate a longer ferrule body. Bore 30i (or bore 20i FIG. 5A) extends along longitudinal axis B-B' through unitary retainer and ferrule assembly (20, 30) in which an optical fiber pig tail and an optical fiber from an optical cable are connected using splicing.

Figure 7:
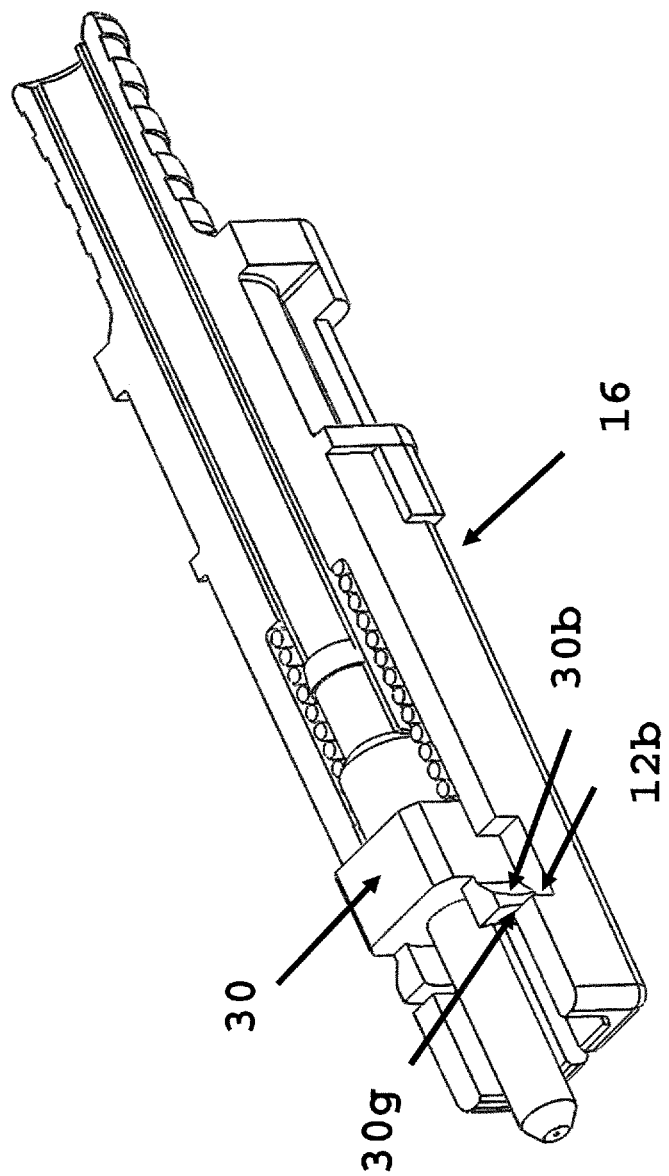
FIG. 7 is a top view, cross-section of the connector of FIG. 1 with a solid view of the unitary retainer and ferrule assembly of FIG. 5B.
Figure 8:
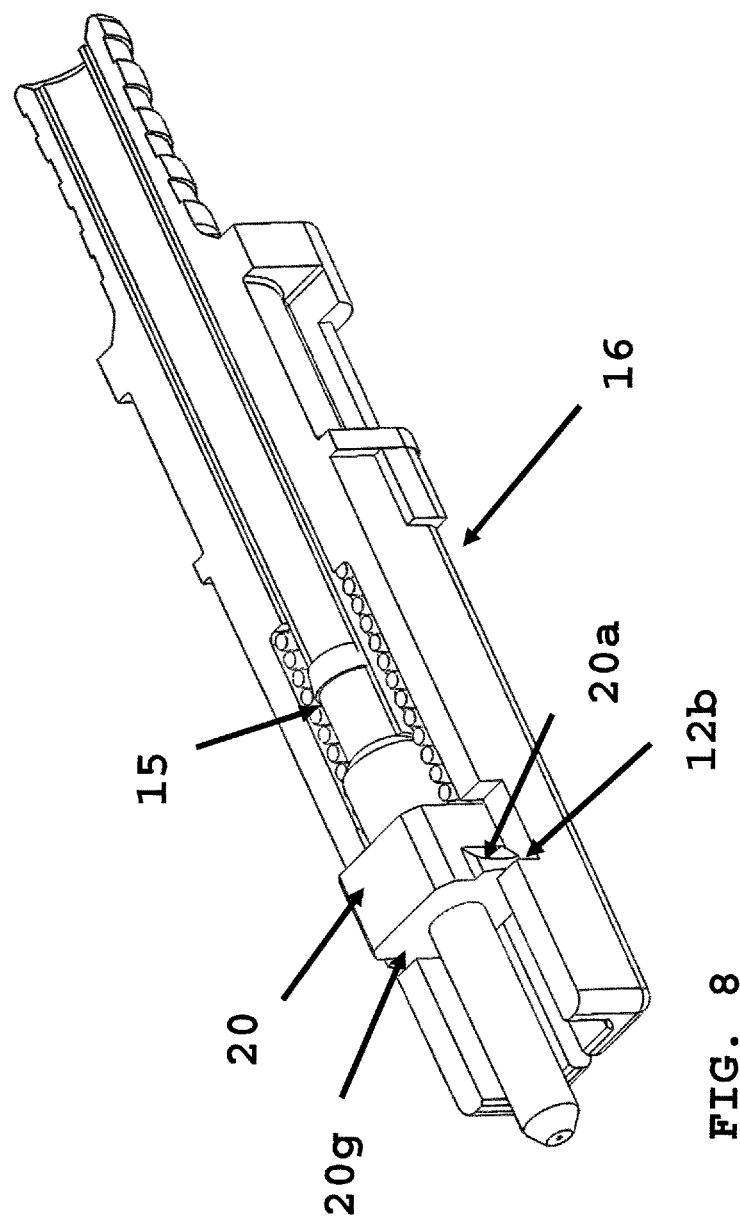
FIG. 8 is a top view, cross-section of the connector of FIG. 1 with a solid view of the unitary retainer and ferrule assembly of FIG. 5A.

FIG. 6 depicts assembly of flange tube 17 in direction of arrow A onto backpost 30e of unitary retainer and ferrule assembly 30 of FIG. 5B. FIG. 7 depicts an open top view, cross-section of unitary connector 16 formed deploying unitary retainer and ferrule assembly 30. Bias spring 15 is compressed when-placed at the distal end of assembly 30 about tube 17 and against inner connector housing, as shown in FIG. 7 or FIG. 8, and applies a force to bias assembly (20, 30) forward. Since protrusion 30b is within opening 12a, face 30g abuts flat 12b which helps secure ferrule 14 from moving during insertion and removal from an adapter port, or when a distal pull force is placed on the fiber optic cable. FIG. 8 depicts connector 16 with unitary retainer and ferrule assembly 20 biased by spring 15 after front loaded into unitary connector 16. As described in FIG. 7, face 20g abuts flat 12b, which secures assembly 20 within housing 16 with bias spring 15.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

It will be understood by those within the art that, in general, terms used herein, are generally intended as "open" terms (for example, the term "including" should be interpreted as "including but not limited to," the term "having" should be interpreted as "having at least," the term "includes" should be interpreted as "includes but is not limited to," et cetera). While various methods and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. The use of such phrases should not imply that the introduction of a claim recitation by the indefinite articles "a" or "an" limits any particular claim containing such recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

What is claimed is:

1. A fiber optic connector, comprising:
   a unitary connector housing having a proximal end and a distal end spaced apart along a longitudinal axis, the distal end being spaced apart from the proximal end in a distal longitudinal direction, the fiber optic connector being configured to terminate an optical fiber cable that extends away from the distal end of the unitary connector housing in the distal longitudinal direction;
   a front loadable unitary retainer and ferrule assembly comprising a retainer body having a proximal end portion and a distal end portion, the distal end portion being spaced apart from the proximal end portion in the distal longitudinal direction, wherein the unitary connector housing is configured to receive the front loadable unitary retainer and ferrule assembly through the proximal end of the unitary connector housing; and
   an adapter latch with a release tab for securing and releasing the fiber optic connector with an adapter port;
   the front loadable unitary retainer and ferrule assembly further comprises at least one protrusion at the proximal end portion of the retainer body; and wherein
   the unitary connector housing comprises an opening formed as part of the unitary connector housing and the protrusion is received and secured in the opening formed as part of the unitary connector housing.

2. The fiber optic connector according to claim 1, wherein the front loadable unitary retainer and ferrule assembly further comprises a ferrule with an optical fiber pigtail and the retainer body secures the ferrule with the optical fiber pig tail in the proximal end portion of the retainer body.

3. The fiber optic connector according to claim 2, wherein the front loadable unitary retainer and ferrule assembly further comprises a biasing member installed over the distal end portion of the retainer body.

4. The fiber optic connector according to claim 3, wherein the front loadable unitary retainer and ferrule assembly further comprises a protective tube formed of an elastic material, the protective tube covers a splice formed between the optical fiber pig tail and an optical fiber of a fiber optic cable secured to a distal end of the fiber optic connector.

5. The fiber optic connector according to claim 3, wherein the bias member is a spring, and the spring biases the retainer body and the ferrule with the optical fiber pigtail of the front loadable unitary retainer and ferrule assembly forward within the unitary connector housing thereby forming the fiber optic connector.

6. The fiber optic connector as set forth in claim 1, wherein when the protrusion is received and secured in the opening, the protrusion is movable within the opening in a limited range of motion along the longitudinal axis.

7. The fiber optic connector as set forth in claim 6, wherein the opening has a proximal end and a distal end spaced apart along the longitudinal axis and an opening length extending from the proximal end to the distal end of the opening; wherein the protrusion has a proximal end and a distal end spaced apart along the longitudinal axis and a protrusion length extending from the proximal end to the distal end of the protrusion; wherein the opening length is greater than the protrusion length.

8. The fiber optic connector as set forth in claim 7, wherein the limited range of motion includes a proximal end position in which the proximal end of the protrusion engages the unitary connector housing at the proximal end of the opening and a distal end position in which the distal end of the protrusion engages the unitary connector housing at the distal end of the opening.

9. The fiber optic connector as set forth in claim 1, further comprising a ferrule spring between the retainer body and the connector housing yieldably biasing the retainer body in a proximal direction opposite the distal direction relative to the connector housing.

10. The fiber optic connector as set forth in claim 9, wherein the protrusion and the opening are configured to allow the retainer body to be displaced in the distal direction relative to the unitary connector housing whereby the retainer body compresses the spring.

11. A fiber optic connector, comprising:
a front loadable unitary retainer and ferrule assembly comprising a ferrule and a retainer body;
a unitary connector housing with a proximal end configured to receive the front loadable unitary retainer and ferrule assembly; and wherein
the retainer body of the front loadable unitary retainer and ferrule assembly further comprises at least one protrusion at a proximal end; and
wherein the unitary connector housing comprises an opening formed as part of the unitary connector housing and the at least one protrusion is received and secured in the opening formed as part of the unitary connector housing such that the ferrule and the retainer body are movable as a unit with respect to the unitary connector housing in limited range of motion while the protrusion is received and secured in the opening formed as part of the unitary connector housing.

12. The fiber optic connector as set forth in claim 11 wherein the at least one protrusion comprises a pair of protrusions on opposite sides of the retainer body, and the unitary connector housing comprises two openings, each protrusion being received in a respective one of the openings.

13. The fiber optic connector as set forth in claim 11, further comprising a ferrule spring between the retainer body and the unitary connector housing, the ferrule spring yieldably biasing the retainer body and the ferrule in a proximal longitudinal direction relative to the connector housing.

14. The fiber optic connector as set forth in claim 13, wherein the protrusion and the opening are configured to allow the ferrule and the retainer body to be displaced in the distal direction relative to the connector housing whereby the retainer body compresses the spring.

15. The fiber optic connector as set forth in claim 11, wherein the opening has a proximal end and a distal end spaced apart along a longitudinal axis and an opening length extending along the longitudinal axis from the proximal end to the distal end of the opening; wherein the protrusion has a proximal end and a distal end spaced apart along the longitudinal axis and a protrusion length extending along the longitudinal axis from the proximal end to the distal end of the protrusion; wherein the opening length is greater than the protrusion length.

16. The fiber optic connector as set forth in claim 15, wherein the limited range of motion includes a proximal end position in which the proximal end of the protrusion engages the unitary connector housing at the proximal end of the opening and a distal end position in which the distal end of the protrusion engages the unitary connector housing at the distal end of the opening.

17. The fiber optic connector as set forth in claim 11 wherein the at least one protrusion comprises a pair of protrusions on opposite sides of the retainer body, and the unitary connector housing comprises two openings, each protrusion being received in a respective one of the openings.

* * * * *